No. 871,830. PATENTED NOV. 26, 1907.
J. J. SOUDER.
METAL JOINT.
APPLICATION FILED MAR. 11, 1907.
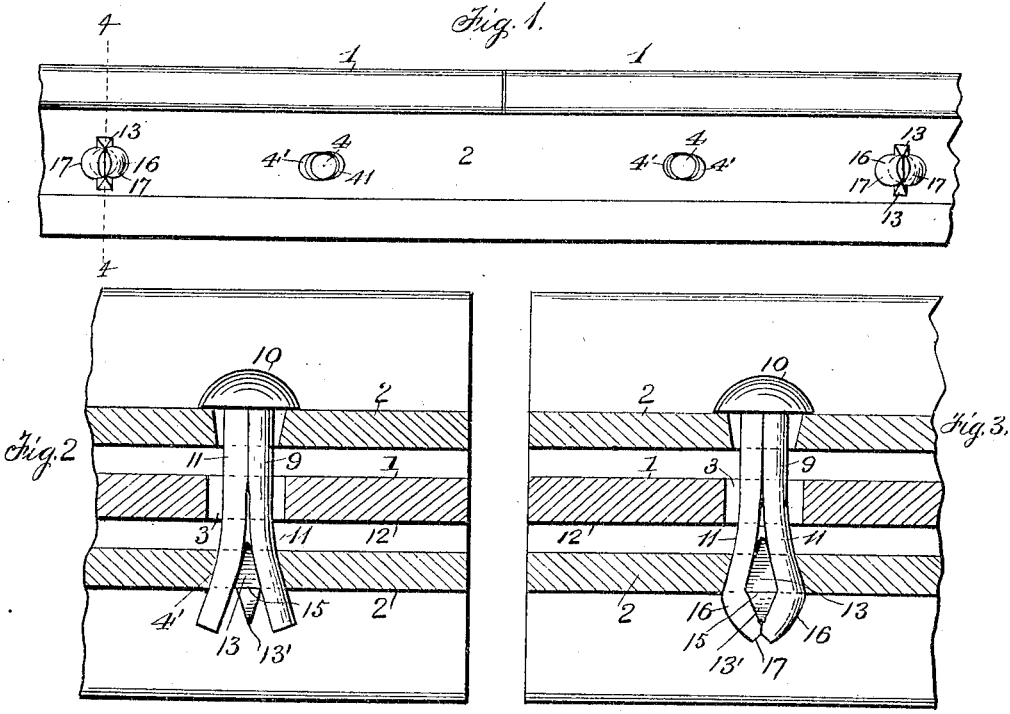
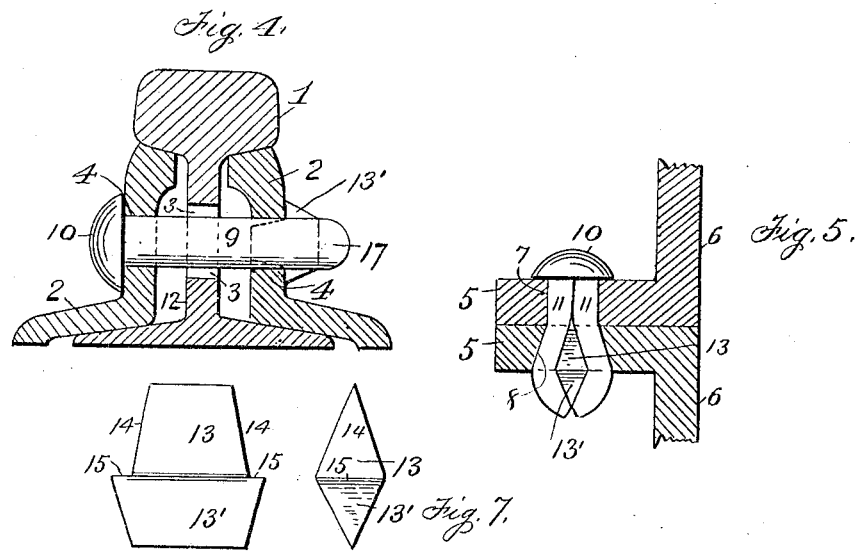
Witnesses
Inventor
J. J. Souder.
By ____ Attorney

UNITED STATES PATENT OFFICE.

JACOB J. SOUDER, OF WASHINGTON, DISTRICT OF COLUMBIA.

METAL JOINT.

No. 871,830.  Specification of Letters Patent.  Patented Nov. 26, 1907.

Application filed March 11, 1907. Serial No. 361,850.

*To all whom it may concern:*

Be it known that I, JACOB J. SOUDER, a citizen of the United States, residing at Washington, in the District of Columbia, have invented certain new and useful Improvements in Metal Joints; and I do hereby declare the following to be a full, clear, and exact description of the invention, such as will enable others skilled in the art to which it appertains to make and use the same.

My invention relates to metal joints for rail-road rails, structural iron, such as used for building purposes, in the construction of cars, and like joints in which two or more parts are to be united or joined together without welding.

The invention has for its object economy in labor, time and material, and the production of a joint which cannot accidentally become separated, and consists in certain improvements in construction whereby nuts are dispensed with and the bolts rigidly secured in the parts joined, as will be fully disclosed in the following specification and claims.

In the accompanying drawings, which form part of this specification:—Figure 1 is a side elevation of a rail-road rail joint showing the application of my invention thereto.
Fig. 2 a horizontal section showing a bolt in the openings of a rail joint and a wedge inserted between the separable members of the bolt before the ends of said members have been bent inward over the wedge. Fig. 3 a like view showing a completed joint. Fig. 4 a vertical transverse section on line 4, 4, Fig. 1. Fig. 5 a vertical section showing the application of the invention to the flanges of two pieces of structural iron. Fig. 6 a side view of the wedge on an enlarged scale, and Fig. 7 an edge view of the same.

Reference being had to the drawings and the designating characters thereon, the numeral 1 indicates a rail-road rail and 2, 2, fish-plates of standard construction. The rail is provided with openings or holes 3 and the fish-plates are provided with openings or holes 4, the openings 3 in the rails being of greater diameter than the openings 4, to allow for expansion and contraction of the rail, and the openings 4 are elongated and provided with flaring or inclined end walls 4', in keeping with the standard construction of fish-plates in general use on said rail-roads, to avoid the necessity for changing the fish-plates, and to provide for the use of the ordinary bolt now in use for securing rail joints in cases of emergency, such as wrecks, or repairs made by others than the track construction men.

It is obvious that in the construction of new roads, the openings or holes 4, in one of the fish-plates may have parallel walls, and the openings in the opposite fish-plate may be conical to allow for the expansion or separation of the members of the bolt therein, as will hereinafter more fully appear.

5, 5, are flanges of structural iron beams, columns or the like, whose opposite or right angled member 6 is of the usual construction. One of the flanges 5 is provided with the usual openings 7, only one of which is shown, in which the walls of the openings are parallel, while the openings 8 in the opposite flange, only one of which is shown, are provided with a flaring or conical wall, as shown in Fig. 5.

9 indicates a bolt having a solid head, unwelded and separable members 11, 11, in parallel planes, and extending through the parts to be joined together. For structural iron work the members 11, are preferably separable to the inside of the head, to provide for irregularities in the register of the openings in the flanges, and the lateral expansion or separation of the members 11, 11, of the bolt to fill the openings in the flanges, and make a solid joint that will pass the test of the inspector by its clear ring when struck by a hammer. For use in joining these members, such as a rail and plates on the opposite side thereof, as in rail-road rail and other joints, I prefer to separate the members 11, 11, in the openings in the rails slightly, so as not to interfere with the expansion and contraction of the rail, but to provide for drawing from the center of the head in swaging the ends of the members 11, and to make sure that the members are separated to engage the flaring end walls 4' of the openings 4 and draw the fish-plates 2 tight against the sides of the web 12 of the rail 1.

13 indicates the wedge which is provided with a head 13' extending beyond the edges 14 of the wedge and forming shoulders 15, which rest upon the plates 2, 2, or flanges 5, while the body of the wedge which is of a width approximately equal to the diameter of and extends into the openings 4 or 8 between the members 11, 11 of the bolt 9, separating said members, and the shoulders finding a seat on the plates or flanges adjacent to the openings, assist in preventing the bolt turning in the joint.

The members 11, 11 are bent laterally outward or bulged beyond the diameter of the wall of the openings 4 or 8, at 16, 16 and form a resistance toward any tendency to separate the joint laterally under the pressure of passing engines and trains or by extraordinary side or lateral pressure due to an engine or cars jumping the track. The members 11, 11, are then bent inward at 17, 17, over the outer end of the head 13' of the wedge 13, covering the head of the wedge and draw the bolt head tight against the part of the structure against which it rests, and the swaging of the ends of the members 11, 11, produces a solid bearing on the part of the structure against which they impinge.

The wedge 13 is inserted between the members 11, 11, and the ends thereof bent as described by a suitable swaging tool especially constructed for this purpose.

Having thus fully described my invention, what I claim is

1. A metal joint comprising opposite members provided with openings to receive a bolt, the opening in one of said members having a conical wall, a bolt provided with a solid head and separable members extending through the conical walled opening, and a wedge whose width is approximately equal to the diameter of said conical opening, resting between said members of the bolt and extending into said opening and having the ends of the members bent inward, over and approximately covering the wedge.

2. A metal joint comprising opposite members provided with openings to receive a bolt, the opening in one of said members having a conical wall, a bolt provided with a solid head and members separable to the head and extending through said conical opening, and a wedge whose width is approximately equal to the diameter of said conical opening, resting between said members of the bolt and extending into said opening and having the ends of the members bent inward, over and approximately covering the wedge.

3. A metal joint comprising opposite members provided with openings to receive a bolt, the opening in one of said members having a conical wall, a bolt provided with a solid head and separable members extending through the conical walled opening, and a wedge whose width is approximately equal to the diameter of said conical opening, and having a head extending beyond the edges of the body of the wedge and forming shoulders thereon, said wedge extending into said latter opening between said members to the shoulders on the wedge, and having the ends of the members bent inward, over and approximately covering the head of the wedge.

4. A metal joint comprising a rail having bolt openings therein, plates on opposite sides of the rail provided with openings of less diameter than the openings in the rail, a bolt provided with a solid head and separable members extending through the plates and the rail, and a wedge whose width is approximately equal to the diameter of said opening, resting between the members of the bolt and extending into the opening in one of said plates and separating said members in the opening in the rail and having the ends of the members beyond the plate bent inward, and over and approximately covering the outer end of the wedge.

5. A metal joint comprising a rail having bolt openings therein, plates on opposite sides of the rail provided with openings of less diameter than the openings in the rail a bolt provided with a solid head and separable members extending through said plates and the rail, and a wedge having a head extending beyond the edges of the body of the wedge and forming shoulders thereon, and said wedge extending into the opening in one of the plates between said members of the bolt to the shoulders on the wedge, with said shoulders resting on the plate beyond the wall of the opening and having the ends of the members bent inward over and approximately covering the head of the wedge.

6. A metal joint comprising a rail-road rail having bolt openings therein, fish-plates on opposite sides of said rail provided with openings of less diameter than the openings in the rail, the openings in one of the fish-plates having flaring end walls, a bolt provided with a solid head and separable members extending through the openings in the fish-plates and the rail, and a wedge whose width is approximately equal to the diameter of said opening, resting between the members of the bolt and extending into the opening in one of the fish-plates, said members being bent outward against said flaring end walls and inward, over and approximately covering the wedge.

In testimony whereof I affix my signature, in presence of two witnesses.

JACOB J. SOUDER.

Witnesses:
D. C. REINOHL,
W. PARKER REINOHL.